United States Patent [19]

Chrysler

[11] 4,138,155
[45] Feb. 6, 1979

[54] REMOVABLE ROOF PANELS FOR VEHICLES

[76] Inventor: Richard R. Chrysler, 8940 Rickett Rd., Brighton, Mich. 48116

[21] Appl. No.: 848,483

[22] Filed: Nov. 4, 1977

Related U.S. Application Data

[63] Continuation-in-part of Ser. No. 755,665, Dec. 30, 1976.

[51] Int. Cl.² .............................................. B60J 7/08
[52] U.S. Cl. .................................................. 296/137 B
[58] Field of Search ................... 296/137 B, 1 R, 146, 296/137 R; 49/36, 483, 495

[56] References Cited

U.S. PATENT DOCUMENTS

| | | | |
|---|---|---|---|
| 2,556,062 | 6/1951 | Buehrig | 296/137 B |
| 2,938,749 | 5/1960 | Podolan | 296/146 |
| 2,973,221 | 2/1961 | Blackman | 49/36 |

Primary Examiner—Robert R. Song
Attorney, Agent, or Firm—Fisher, Gerhardt & Groh

[57] ABSTRACT

A removable roof panel arrangement for motor vehicles and the method of installing such panels in which access openings to be covered by the panels are formed at opposite sides of the center of the vehicle body by completely cutting away a transverse section of the roof of the vehicle body and subsequently installing a unitary frame member which is attached to forward and rearward portions of the original vehicle roof. The construction retains the strength of the original body and the frame members form drainage troughs and support sealing members for engaging the removable panels to maintain the panels in weather tight relationship to the roof of the vehicle.

10 Claims, 16 Drawing Figures

REMOVABLE ROOF PANELS FOR VEHICLES

This is a continuation-in-part application of my co-pending application Ser. No. 755,655 filed Dec. 30, 1976.

This invention relates to vehicle bodies and more particularly to removable panel arrangements for the roof of vehicles and the method of installing such panels in the roof portion of conventional automobiles.

Removable panels have been provided of the type in which a pair of panels are disposed in association with the door opening at opposite sides of the vehicle. In such an arrangement, installation is made by cutting away openings in the roof leaving a portion of the original body disposed longitudinally of the body and between the openings which are to be covered by the panels. Such arrangements are referred to as T-tops or hatch tops and or difficult to make since they require careful positioning of templates relative to each other and complex installation and finishing of the perimeter of the roof openings. In addition, such installations if not properly made, could change the ability of the body to withstand certain loads imposed during operation of the vehicle. Also, the original vehicle top extending centrally often is maintained at a relatively wide width which limits the size of the panel openings.

It is an object of the invention to provide a removable panel arrangement for vehicle roofs and the method of installing such panel arrangements in which the installation is greatly simplified.

Another object of the invention is to provide a panel arrangement and method of installation in which, although the roof section is reduced, the arrangement reinforces and strengthens the body.

A further object of the invention is to provide a panel arrangement and method of installation by which roof openings to accept a pair of panels may be made large in both the transverse and longitudinal direction of the vehicle.

Still another object of the invention is to provide a panel arrangement and method of installation in which a pair of panels in closed position and at opposite sides of the vehicle have the appearance of being substantially concontinuous across the vehicle roof.

Another object is to provide an improved sealing and drainage system for a removable panel arrangement for vehicles which maintains the vehicle roof in weather-tight condition.

A removable roof panel arrangement and method of installation of such panels in vehicles has been provided in which the original body of the vehicle is cut transversely to remove a roof section to the rear of the windshield header. The removed roof section is replaced with forward and rearward frame members which are joined by a central longitudinal member and a reinforcing member which has portions disposed transversely of the vehicle and longitudinally of the vehicle and which is fastened to the transverse frame member and central frame member so that the beaming strength and resistance to torsional deflection is retained in the vehicle body. The roof openings defined by the forward, rearward and central frame members are provided with a molding and seal arrangement which forms a trough for accumulating and draining moisture from the roof to the sides of the vehicle. The molding acts also to retain a resilient seal which engages the roof panels closing the opening to form a weather-tight roof with the seals themselves forming an auxiliary drainage system to accumulate and drain moisture that may escape the sealing surfaces engaging the panel. The panels themselves are held detachably in position and may be formed of transparent, opaque or solid materials. In another embodiment of the invention the removed roof section is replaced with a unitary frame having forward and rearward frame portions joined together by a central longitudinal member. In this arrangement a lesser number of parts is utilized and the unitary construction adds strength without requiring additional fasterners and the like.

Figure 1:
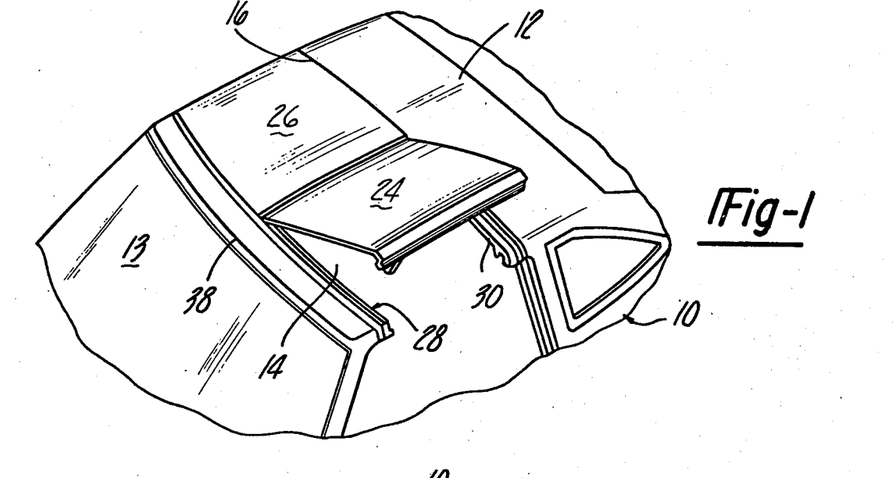
FIG. 1 is a perspective view of a roof portion of a vehicle body with roof panels embodying the present invention shown in their relative positions with one of the panels partially removed.
Figure 2:
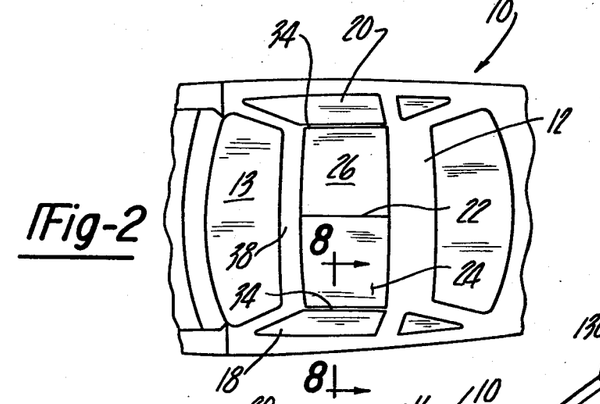
FIG. 2 is a top view of a portion of the vehicle body showing the panel portions in position.
Figure 3:
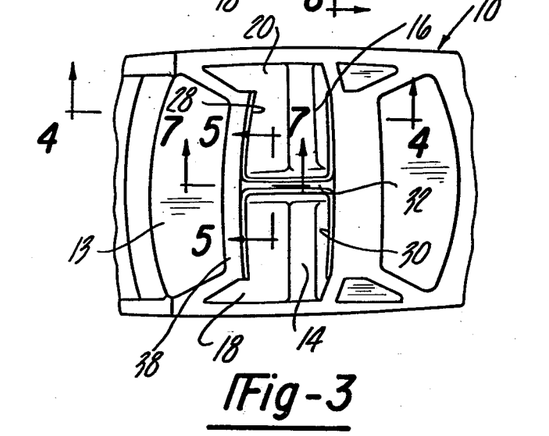
FIG. 3 is a view similar to FIG. 2 showing the roof panels removed.

The removable roof panel arrangement of the present invention is incorporated in an automotive vehicle body 10 having a roof portion 12 extending rearwardly from the windshield 13. The roof portion 12 is provided with a pair of openings 14 and 16 which are best seen in FIG. 3 and are an extension of the window openings 18 and 20 disposed at opposite sides of a longitudinal center line 22 of the vehicle as best seen in FIG. 2. The openings 14 and 16 are closed with detachable panels 24 and 26, respectively, which may be removed if desired and when in place as seen in FIG. 2, form a weather-tight roof assembly.

In general the openings 14 and 16 are formed by portions of a forward frame member 28, a rearward frame member 30 and a central frame member 32. The frame members act to form three sides of each of the openings 14 and 16. The fourth side of the openings merges with the window openings 18 and 20. When panels 24 and 26 are in place as seen in FIG. 2 the sill of edge portions 34 of the panels form the fourth side and act to engage the upper edge of the windows 36 which close the window openings 18 and 20.

Figure 4:
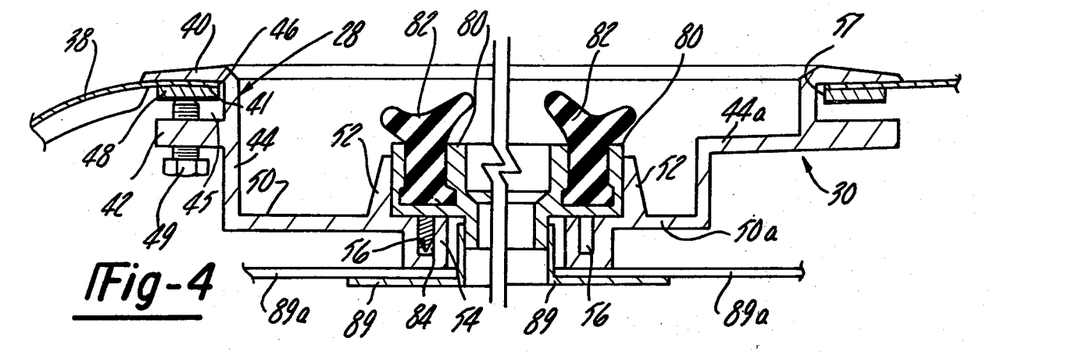
FIG. 4 is a cross-sectional view at an enlarged scale taken generally on line 4—4 in FIG. 3.

The forward frame member 28 extends transversely of the vehicle rearwardly of a windshield header 38 immediately above the windshield 13. As best seen in FIG. 4 the forward frame member 28 is made of a formed aluminum extrusion having a relatively complex cross section. The forward frame member 28 has a trim flange 40 adapted to engage the upper surface of the sheet metal layer 41 forming a part of the roof adjacent to the windshield header 38. The trim flange 40 is disposed parallel to a mounting flange 42 extending from a generally vertically extending web 44. The trim flange and mounting flange form a space 45 to receive a marginal edge 46 of the sheet metal layer 41 of the roof and a reinforcing member 48. The reinforcing member 48 is generally the same length as the frame member 28 and lies at the underside of the sheet metal edge portion 46 opposite to the trim flange 40. The reinforcing member 48 is held in position to sandwich the metal roof portion between the trim flange 40 and the reinforcing member 48 by a plurality of uniformly spaced screws 49 which are threadably engaged in the mounting flange 42.

The lower end of the web portion 44 has a base portion 50, the upper surface of which has a vertical wall 52 extending parallel to the web 44 and acting with the latter and the base 50 and wall 52 to form a trough which acts to accumulate and divert moisture. A bracket portion 54 is formed to one side of the wall 52 and is in the form of a channel having a groove 56 disposed generally parallel to the wall 52.

The rearward frame member 30 has a cross section very similar to the forward frame member 28 except that instead of a web 44 a stepped web 44a is employed so that the base portion 50a is narrower than the base portion 50 of the forward frame member 28. The wall 52 and opposed portion of the stepped web 44a form a trough similar to that associated with the forward frame member 28. The frame member 30 is mounted on a rearward edge portion 57 of the sheet metal roof which extends transversely of the vehicle to the rear of the window openings 18 and 20.

Figure 5:
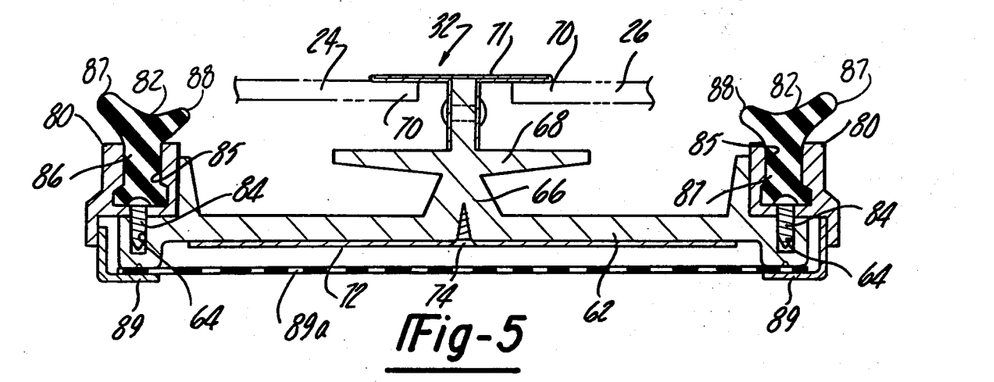
FIG. 5 is a cross-sectional view at an enlarged scale taken generally along line 5—5 in FIG. 3.
Figure 6:
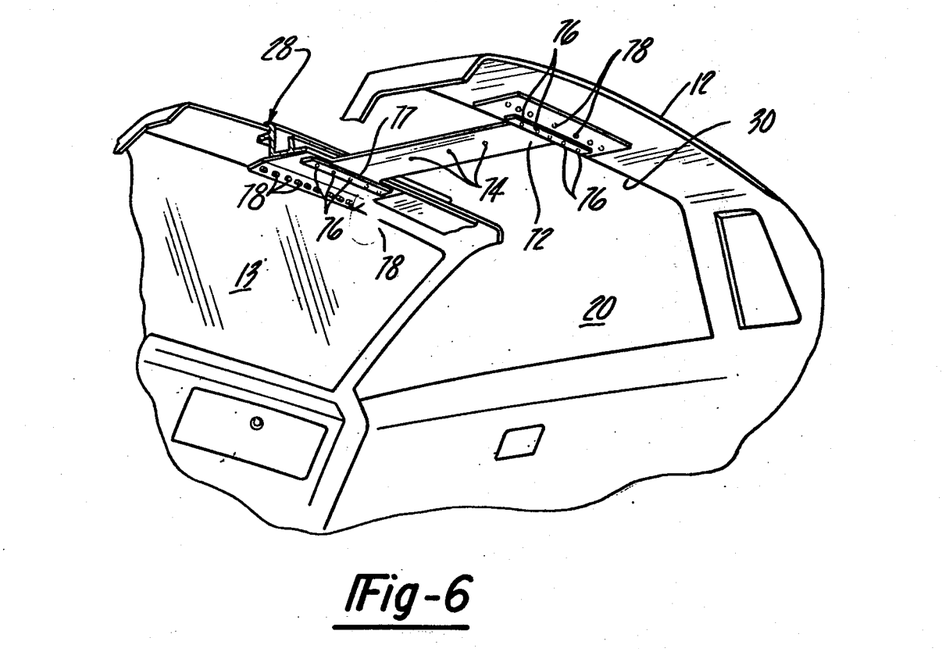
FIG. 6 is a perspective view from the interior of the vehicle and showing the underside of the roof and reinforcing portion.
Figure 7:
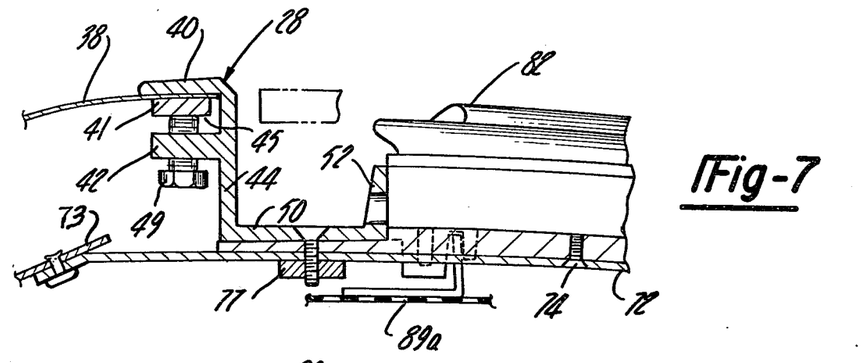
FIG. 7 is a cross-sectional view taken generally on line 7—7 in FIG. 3.

The forward frame member 28 and rearward frame member 30 are joined together by the central frame member 32 which is best seen in FIGS. 5, 6 and 7. The central frame member 32 is an aluminum extrusion having a base portion 62 the opposite marginal edges of which are provided with U-shaped channel portions having a groove 64. A central portion of the base member 62 has a web 66 which extends generally vertically upwardly. Extending from opposite sides of the web portion 66 and elevated above the base 62 is a platform portion 68 which serves as a guide for the central or inner edge portions 70 of the panels 24 and 26 when they are being placed into closing position. The upper end of web 66 has a T-shaped molding 71 which engages the top of the panels 24 and 26 adjacent the inner edges 70.

As seen in FIG. 6 the underside of the central frame member 32 is provided with a reinforcing member 72 which acts not only to facilitate fastening of the central frame member to the forward and rearward frame members but also to absorb various loads which might be imposed on the vehicle during its operation. The reinforcing member 72 preferably is of steel sheet material and as best seen in FIG. 6 is generally H-shaped in configuration so that when the frame member is in position, the reinforcing member 72 has portions for attachment not only to the central frame member 32 but also to portions of the forward and rearward frame members 28 and 30 which are disposed to opposite sides of the central frame member. The reinforcing member 72 is attached to the central frame member by a plurality of fasteners such as screws 74. The assembly of the central frame member 32 and the reinforcing plate 72 are held rigidly in position relative to the forward and rearward frame members 28 and 30 by means of bolts 76 which pass through the forward frame member 28, the central frame member 32, the reinforcing plate 72 and a tapping plate 77. A tapping plate 77 is used in association with both the forward and rearward frames 28 and 30. Additionally pop rivets 78 may be used to secure the reinforcing plate 72 to the frame members or to other transverse frame members of the body, not shown.

Although the reinforcing plate 72 is relatively thin it makes it possible to use a relatively narrow central frame member 32 so that the openings 14 and 16 have a maximum transverse dimension and so that the appearance from the exterior is that the inboard edges of the panels 24 and 26 are close to each other. The reinforcing member 72 acts in conjunction with the central frame member 32 to increase the beaming strength of the vehicle body. By beaming strength is meant the tendency of the forward and rearward frame members 28 and 30 to move towards each other in the absence of a central structural member. The horizontal cross-sectional portions of the central beam assembly such as the base member 62, the platform 68 and the reinforcing member 72 serve to increase the resistance to torsional distortion of the body. Torsional distortion is the characteristic of the body which causes the rearward portion of the body to move or twist relative to the forward portion of the body about a longitudinal axis passing intermediate the body roof and floor. Such torsional displacement requires the forward and rearward frame members 28 and 30 to move laterally relative to each other and would require a distortion of the reinforcing member 72.

A seal assembly including a seal retainer 80 and a seal 82 extends around three sides of each of the openings 14 and 16. The seal retainer 80 is in the form of an aluminum extrusion having a general channel shaped cross section as seen in FIGS. 4 and 5. The retainer 80 is secured in position relative to the forward and rearward frame members and the central frame member by means of self tapping screws 84, the threads of which engage the opposing walls of the grooves 54 and 64. The seal retainer 80 extends along three sides of each of the openings 14 and 16. The groove 85 of the channel shaped retainer 80 receives the seal 82 which is made of a foam like rubber material and has a generally Y-shaped configuration with a leg 86 which fits in the groove of the retainer and arms 87 and 88. With the panels 24 and 26 in position the flexible arms 87 and 88 are deformed to form a weather-tight seal with the underside of the panels. When the panels are removed the seal portions formed by arms 87 and 88 return to their as molded condition and any moisture that passes the arm 87 accumulates in the space between the arms 87 and 88 and is diverted to the side of the vehicle.

The interior of the vehicle body in the areas of the frame members 28, 30 and 32 may be finished by a molding member 89 which may be fastened to the frame members in any conventional manner as by screws to clamp the headliner 89a which typically is used to finish off the interior of the vehicle.

Figure 8:
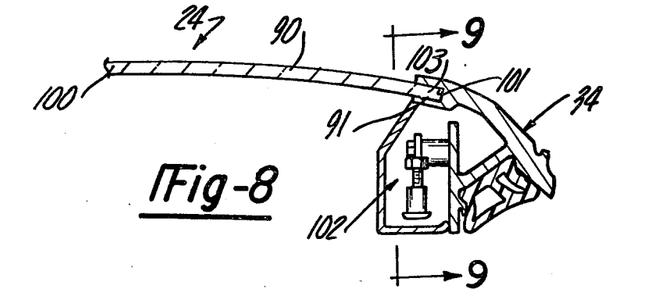
FIG. 8 is a sectional view of a portion of a roof panel taken generally on line 8—8 in FIG. 2.
Figure 9:
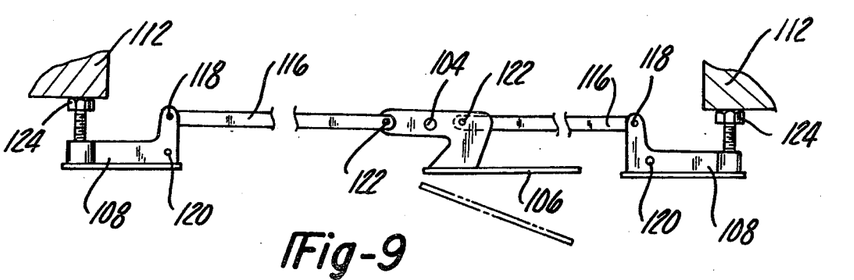
FIG. 9 is a view of the latch mechanism used to retain the roof panel in position.
Figure 10:
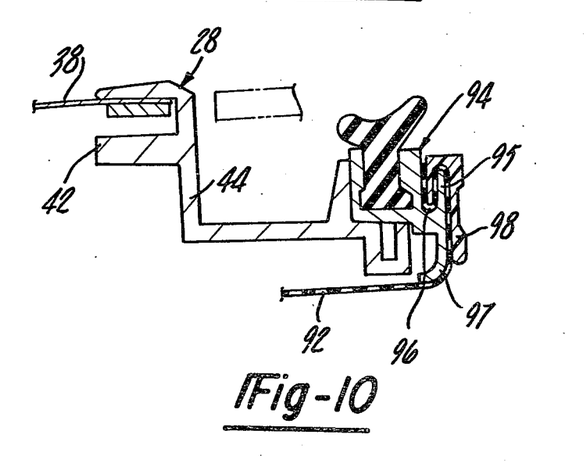
FIG. 10 is a modification of a portion of the arrangement seen in FIG. 4.

The headliner 89a indicated in FIGS. 4 and 5 is a semi-rigid structure. In some vehicles however the headliner is of a flexible cloth material such as the indicated at 92 in FIG. 10. With flexible headliners 92, a modified seal retainer 94 is used which is provided with an upper flange 95 forming a slot 96 and a lower flange 97. The soft headliner materials is pulled tightly about the flange 97 and is locked in position in the slot 96 by means of a retainer strip 98 which serves to hold the flexible headliner 92 relative to the seal assembly 94 at three sides of the panel openings 14 and 16. The openings 14 and 16 are closed by the panels 24 and 26 each of which is generally identical so that it becomes necessary to refer only to the panel 24. Referring now to FIG. 8 the panel 24 includes a panel portion 100 of laminated or tempered glass, sheet metal or plastic. The outboard edge 101 of the panel 24 is fitted with the window header or sill 34 including a latch assembly 102. The window header 34 is an aluminum extrusion having a slot 103 for receiving the outboard edge 101 of the panel 100. The header 34 supports the latch arrangement 102 which as seen in FIG. 9 is a mechanism incorporating a single handle 106 to move a pair of lock members 108 at opposite ends of sill 34 adjacent the forward and rearward edges of the panel 24. The lock members 108 are engagable with portions of the body member indicated at 102 to detachably hold the panel 24 in position. The handle 106 is pivoted about an axis indicated at 104 and is pivotally connected to a pair of links 116 the outer ends of which are pivotally connected by pins 118 to the pair of lock mechanisms 108. Each of the lock members 108 is generally L-shaped and is pivoted on the header 34 for movement about an axis indicated at 120. The inner ends of links 116 are pivotally connected at 122. The outboard ends of the lock members 108 are provided with adjustable seats 124 which may be adjusted by rotating them relative to the L-shaped members 108.

The handle 106 is actually an over centered device such that when the panel 24 is in its closed position and the seats 124 are in engagement with the underside of the frame members, pivotal movement of the lock members 108 about their axis 120 is resisted due to the over centered position of the pivot points 122 relative to the pivot 104 which tends to urge the handle 106 in a counterclockwise direction as viewed in FIG. 9. When the handle member 106 is rotated generally in a clockwise direction as viewed in FIG. 9, the seats 124 are moved out of engagement with the portions 112 and permit the panel member 24 to be first pivoted generally upwardly about its inner edge 70 after which it may be removed from engagement with the central frame member 32. Upon removal of the panel member 24 and 26 they may be stored in the vehicle for replacement when needed.

Figure 11:
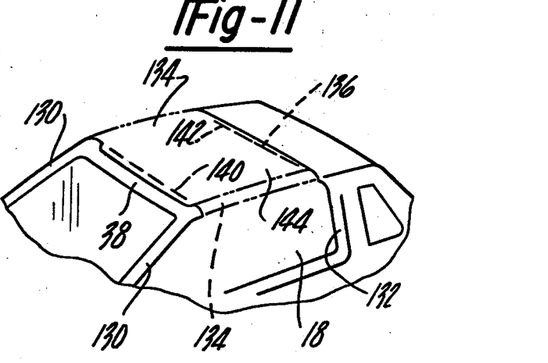
FIG. 11 is a perspective view of the roof portion of a vehicle body prior to modification.

The present panel construction is particularly adapted for installation in the conventional bodies of vehicles having a solid metal top roof portion. The method of converting or modifying the roof of a conventional automotive body will best be understood by referring to FIG. 11 in which one type of conventional vehicle body 10 has a roof construction including the windshield header 38 which is supported by a pair of pillars 130 at opposite sides of the windshield and at the forward leading edge of the window openings 18 and 20. The rearward edge of the window openings are formed by another pair of vertically extending pillars 132 which are joined to the forward pillars by side rails 134 at opposite sides of the vehicle also one or more cross members 136 may be used. A sheet of material, usually of metal is integrally fastened to cover the windshield header 38, side rails 134 and any other structural cross members 136.

In preparation for installation of the roof panel assembly of the present invention, the vehicle body is prepared for modification by removing certain parts which are either replaced after installation of the panel assembly or are modified and reused. Some of these parts include the interior molding adjacent to the windshield header, the sun visor, interior moldings, liners, such as liners 89a or 92, dome lights and shoulder belt mechanisms. Also, the exterior of the body is prepared by removing weatherstripping around the window cavities.

With the automotive vehicle body prepared in this manner, the vehicle body is modified by cutting the outer sheet metal cover 41 of the roof portion of the vehicle body and the side rails 134 along transverse lines which are generally symmetrical to the longitudinal center line of the vehicle. One of these lines is indicated at 140 and is closely adjacent to the rearward portion of the windshield header 38, the other line is indicated at 142 and extends between the rearward pillars and is spaced rearwardly from the line 140. Cutting of the roof in this manner may be accomplished with metal cutting shears or a saw and after two cuts are made along the lines 140 and 142 the intervening body portion 144 is removed and discarded.

After removal of the portion 144, the forward and rearward frame members 28 and 30, respectively, are installed by using a liberal amount of sealer material in the space 45. With the reinforcing member 48 disposed adjacent to and underneath the edge 46 of the sheet metal roof portion adjacent to the header 38 the edge portion 46 and reinforcing member 48 are disposed in the slot 45. Thereafter, the sheet metal screws 49 are tightened to sandwich the reinforcing member 48, edge portion 46 and the trim flange 40 relative to each other.

After installation of the forward and rearward frame members 28 and 30 the center frame assembly which includes the center frame portion 32 and the reinforcing member 48 is installed by inserting the bolts 76 which pass through the forward frame member 28, the central frame member 32, the reinforcing member 48 and the tapping plate 77.

After the central member is installed by fastening of the bolts 76, additional holes formed in the reinforcing plate are used as guides to drill additional holes which pass either through the transverse forward and rearward frame members or through additional body reinforcing members. Fasteners such as pop rivets may be used to fasten the reinforcing member to such transverse members.

After the central frame member is installed, the next step is to install the seal assembly 79 which includes the seal retainer 80 and the seal 82. The assemblies are installed along the perimeter of each of the openings 14 and 16. The seal retainer is first installed in position by means of the screws 84 which enter the grooves 56 and 64 in the frame members 28, 30 and 32. Thereafter, the leg 86 of seal 82 is pushed into the groove 85 of the seal retainer 80.

Prior to installation of the seal retainer, corner molding elements are installed in the corners at the points where the forward and rearward frame members merge with the central frame member. Preferably the next step in the operation is to trim the original headliner of the vehicle. Such headliners may be of more or less rigid type which is molded as indicated at 89a or of cloth material which is flexible as indicated at 92. To install a semi-rigid headliner 89a, it is cut to fit and moldings 89 made of plastic or metal are used to clamp the headliner in position. With the headliner of soft flexible material 92, the material is wrapped over the flanges 95 and 97 and is held in position by a locking molding 98.

With the interior molding 89 or 98 in place, the various interior components originally removed may be replaced. Such components include the seat belt retractors, sun visors, etc. Thereafter, the previously removed window moldings and weatherstripping are installed. The panels 24 and 26 may be placed in position by using the platform portion 68 as a guide to engage the inner edges 70 of the panels 24 and 26. With the panels guided into the slot formed between the shelf 68 and the T-shaped molding 71, the panel may be pivoted downwardly so that the underside of the panel engages the sealing lips of the seal 82. Thereafter, the panels 24 and 26 are locked in position by moving the handle 106 from its open to its closed position so that the seats 124 engage the underside of the vehicle body portions 112. Adjustment of the seats 124 and the clamping pressure is accomplished by threading the seats 124 relative to the L-shaped members 108.

Referring now to FIGS. 12 through 16, another form of roof panel arrangement is shown wherein a unitary frame member 202 is used which simplifies installation of the roof assembly by replacing the separate front, rear and central frame members 28, 30 and 32. The unitary frame 202 is generally H-shaped with a forward transverse frame portion 204, a rear transverse frame portion 206 and a central portion 208 all integrally join together. Preferably the frame member 202 is made as a sheet metal stamping.

Figures 13, 14:
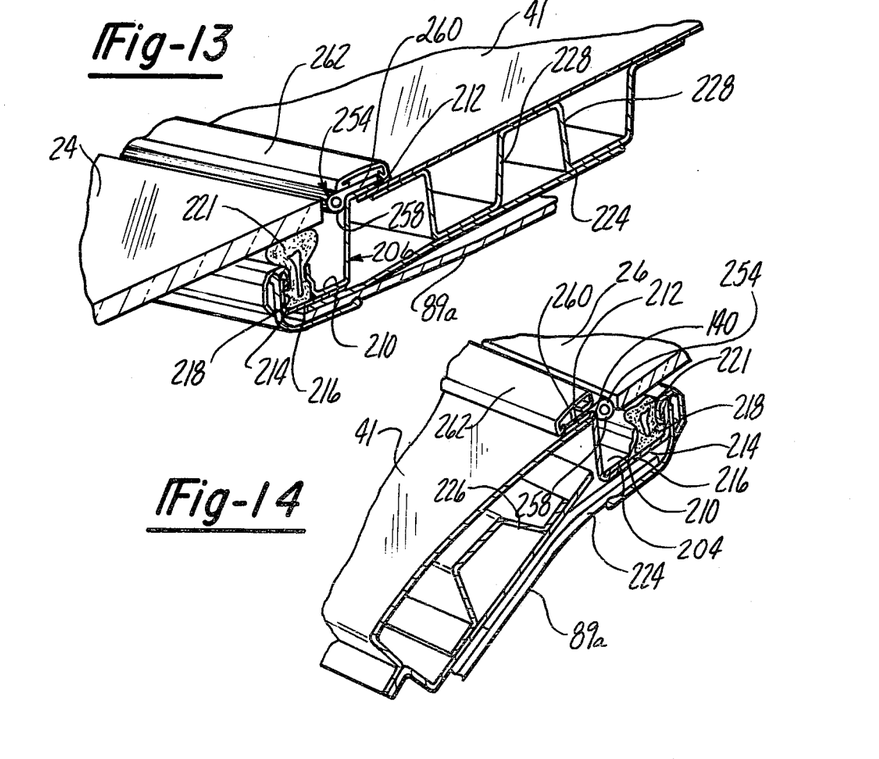
FIG. 13 is a cross-sectional view in perspective taken on line 13—13 in FIG. 12.
FIG. 14 is a cross-sectional view in perspective taken on line 14—14 in FIG. 12.
Figure 16:
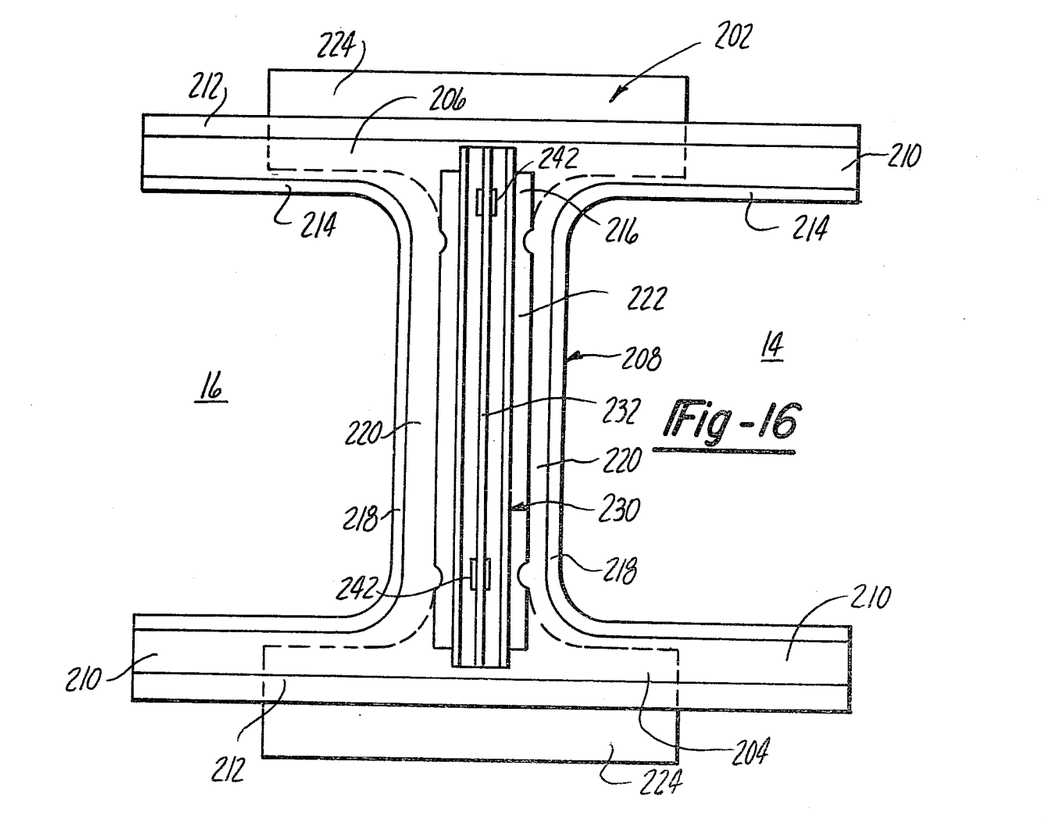
FIG. 16 is a plan view of a portion of the frame member with parts removed in the interest of clarity.

As best seen in FIG. 14 and 16 the ends of the forward frame portion 204 include channel portions 210 having a flange 212 extending the full width of the frame member 202 and adapted to be seated on top of the sheet metal roof 41 adjacent to the edge 140. The rear frame portion 206 has a configuration and arrangement similar to the front frame portion 204 in that its opposite ends have a channel portion 210 and a flange 212 extending the full width of the frame member 202 and resting on top of the roof 41.

Figure 15:
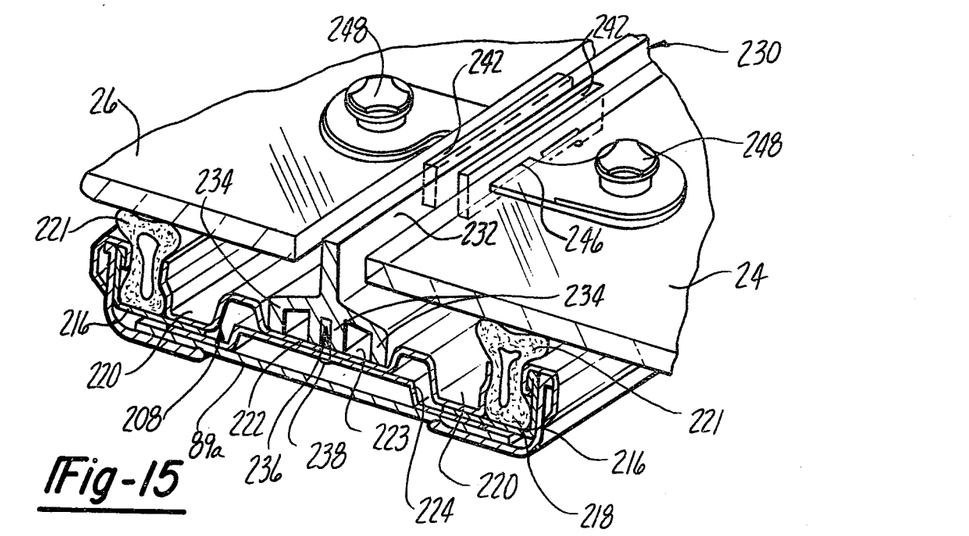
FIG. 15 is a cross-sectional view in perspective taken on line 15—15 in FIG. 12.

Referring now to FIGS. 15 and 16, central frame portion 208 has a pair of channel portions 220 which are separated by a base portion 222. The channel portions 220 communicate with the channel portions 210 of the forward and rearward frame members 202 and 204. The base portion 222 forms a central trough 223 which has its bottom raised slightly above the level of the bottom of the channels 220 and the ends of the trough 223 are open to drain into the transverse channels 210. An elongated edge member 214 having a generally L-shaped cross section has one of its legs 216 welded to the underside of the frame 202 to form a groove 218 which extends around the forward, central and rearward side of the openings formed to opposite sides of the central frame member 208. Each of the continuous grooves 218 receives a continuous length of weatherstrip or sealing material 221 to engage the underside of the panels covering the openings 14 and 16 at opposite sides of the vehicle.

The roof assembly also includes a reinforcing member 224 which has a generally H-shaped configuration conforming to the shape of the frame 202. The reinforcing member 224 is adapted to be positioned under the frame 202. In the assembled condition as seen in FIG. 14, a forward portion of the reinforcing member 224 is complementary to a transverse beam member 226, forming part of the vehicle and is held in place by rivets, not shown. Similarly, the rearward portion of the reinforcing member 224 which is complementary to the rear of the frame portion is riveted to a transverse reinforcing beam 228 forming part of the original structure of the vehicle. The reinforcing member 224 also is fastened by means of rivets or the like to the central frame portion 208. In the fully assembled condition, the reinforcing member performs substantially the same function as the member 72 in the first embodiment of the invention.

The base member 222 which separates the channel portions 220 extends for the full length of the central frame portion 208 but as seen in FIG. 16, terminates at its opposite ends to afford transverse drainage and communicate channel portions 210 at opposite sides of the vehicle centerline with each other and with the channel portions 220.

The central frame 208 receives an elongated divider member 230 which extends the full length of the frame 202. The divider member 230 is preferably made from a formed aluminum extrusion having centrally upwardly extending web 232 and a plurality of downwardly extending flanges 234. A central groove 236 is formed by a pair of the flanges 234 to extend centrally under the web 232 and provides means for gripping the threads of self-tapping screws 238 which act to hold the divider 230 relative to the frame 202.

Figure 12:
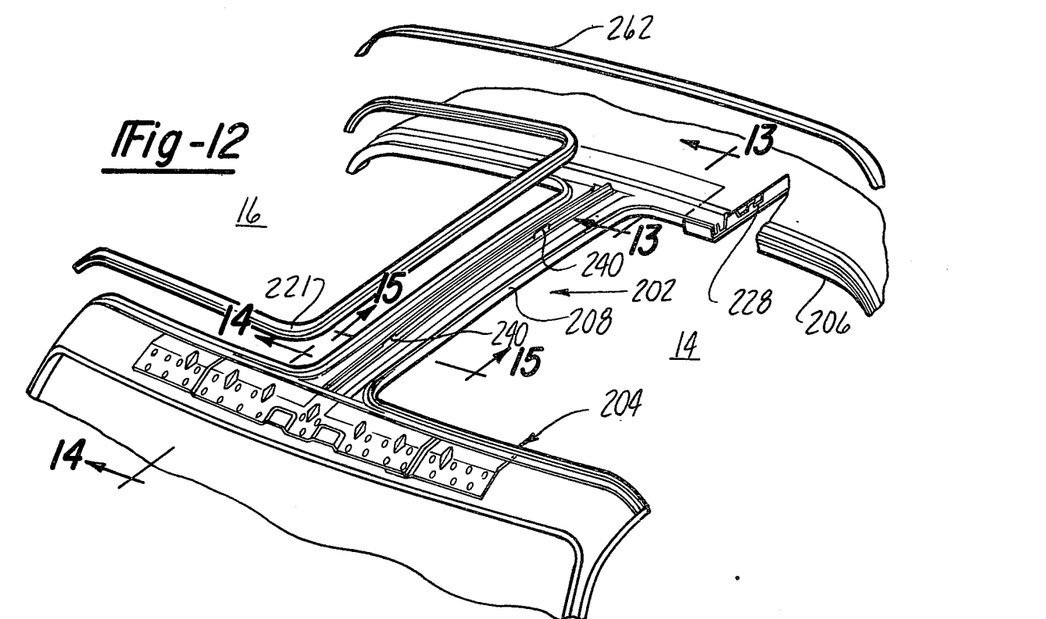
FIG. 12 is a perspective view of a unitary frame structure with parts removed in the interest of clarity.

The web 232 forms part of the latch arrangement acting to hold the inboard edges of the transparent panels 24 and 26 in position relative to the vehicle. For this purpose the web 232 is formed with a pair of longitudinally spaced openings 240 as seen in FIG. 12. The openings 240 are each provided with a pair of nylon inserts at opposite sides of the web 232. The nylon inserts 242 each form a pair of recesses 244 adapted to receive the ends of a pair of tangs 246, one of which is associated with each of the panels 24 and 26. The tangs 246 are attached to the transparent panels 24 and 26 by means of fasteners 248 passing through openings in each of the panels. The latch arrangement associated with the opening 240 adjacent to the rearward frame member 206 is identical with that just described.

During attachment of the panels in position relative to the openings 14 and 16, the tangs 246 are inserted in the recesses 244 and the nylon inserts 242 disposed at each side of the divider web 232 act as a bumper for preventing engagement of the edges at the inboard edge of the panels with the web 232. The nylon inserts 242 also act to insure proper alignment of the panels 24 and 26 in a fore and aft direction and to align the panel edges parallel to the web 232 on the vehicle centerline. With the tangs 246 in latched position in the openings 244, a latch mechanism 102 of the type disclosed in FIGS. 8 and 9 may be used to retain the panels 24 and 26 in position relative to openings 14 and 16.

With the panels in position, the weatherstrip 221 engages the underside of the panel to seal passage of moisture from the exterior of the vehicle to the interior of the vehicle. In addition, a molding and seal assembly 254 extends transversely from one side of the vehicle to the other at both the front and rear frame portions as shown in FIGS. 14 and 13, respectively. The seal assemblies 254 have a sealing element with a tubular portion merging with a radially extending flange 260. The flange 260 is gripped by a trim molding 262 and is held in position for sealing engagement with the forward and rearward edges of the transparent panels 24 and 26.

As seen in FIGS. 13, 14 and 15 the headliner 89a is held in position relative to the frame 202 by a pair of retainers 264 extending around three sides of the panel openings 14 and 16. The retainers 264 are generally L-shaped in cross section with one leg 266 adapted to grip the headliner 89a and the other leg 268 held in position on the strip 214 by a fastener strip 270 which grips the leg 268 and the adjacent leg of the member 214.

Installation of the embodiment of the invention seen in FIGS. 12 through 16 is similar to the embodiment shown in FIGS. 1 through 11 except that fewer parts are employed. After the vehicle has been prepared initially by removing certain of the parts and by cutting the outer sheet metal cover or roof 41, the frame 202 may be inserted and fastened to the roof portion by rivets or the like.

With the frame 202 connected by way of the flange 212 to the roof panel 41, the reinforcing member 224 is installed in position by rivets to form a rigid structure with both the vehicle and the frame member 202. Thereafter the divider member 230 may be installed in position by means of screws. Subsequent installation or replacement of the parts is similar to that of the prior disclosed embodiment.

With the panels in position the weatherstrip 221 engages the underside of the panels and the seal elements 258 engage the forward and rearward edges of the panels. Any moisture which passes from the exterior to the vehicle along the central web 232 and into rough 223 or in the channel portions 220, flows to opposite ends of the central frame member 208 and into the transversely extending channels 210 associated with the forward and rearward frame members 204 and 206. These channels extend to opposite sides of the vehicle and the accumulated moisture flows out at the exterior of the vehicle. The weatherstrip 221 acts to separate the channels 210 and 220 from the interior of the vehicle. The seal elements 258 serve to minimize the amount of moisture which can pass the panels into the channels 210 and 220.

A removable panel arrangement for the roofs of vehicles and the method of installing such an arrangement has been provided in which the removable roof panels or hatches are used to cover openings formed in the roof at opposite sides of the center of the vehicle. The openings which are covered by the panels are formed by cutting the roof of the vehicle body transvesely and by removing the intervening portions of the roof. Thereafter the central frame member in one embodiment of the invention and a rigid, stamped frame assembly in another embodiment of the invention is installed between the cut edges so that in both cases a pair of openings are formed at opposite sides of the center of the vehicle. The openings are fitted with moldings or weatherstrip which engage the underside of the removable panels which are detachably attached to cover the panel openings. The central frame member and the center portion of the stamped rigid frame are provided with a reinforcing member which makes it possible to use a narrower central section between panel openings giving the appearance that the inboard edges of the panels are substantially adjacent to each other. The longitudinal spacing between forward and rearward edges of the openings can be greater than otherwise would be possible to afford large access openings without diminishing from the body strength of the vehicle.

The embodiments of the invention in which an exclusive property or privilege is claimed are defined as follows:

1. A roof assembly for a vehicle having a windshield header and window openings at opposite sides of the vehicle, said vehicle forming a transverse opening in the vehicle roof defined by a forward edge portion and rearward edge portion in said roof, said edge portions extending from a window opening at one side of said vehicle to the window opening at the other side of said vehicle, an H-shaped frame having a forward frame portion and a rearward frame portion joined integrally with a center frame portion, said H-shaped frame having said forward frame portion connected to said forward edge and said rearward frame portion connected to said rearward edge with said center frame portion disposed on the center line of said vehicle, said H-shaped frame forming a pair of oppositely extending spaces at the opposite sides of said central frame portion, and a pair of panels removably covering said openings, said H-shaped frame forming transverse extending drainage channels communicating with each other by a central drainage channel, said channels being adjacent edge portions of said panels when the latter are in a closed position relative to said openings.

2. The combinations of claim 1 in which a pair of seal members are arranged at opposite sides of said central frame member and extend continuously between said channels and said openings for engaging the underside of said panels for maintaining said panels sealed from the underside of said panels.

3. The combination of claim 2 further comprising an additional seal member extending parallel to said transverse drainage channels and engaging the forward and rearward edges of said pair of panels.

4. The combination of claim 1 in which said central drainage channel is disposed at one side of said center frame portion and a second central drainage channel is disposed at the other side of said center frame portion and communicates with said transverse extending drainage channels.

5. The combination of claim 1 and further comprising a divider extending longitudinally and centrally between said panels, said divider being relatively narrow to maintain said panels separate and at a minimum distance apart from each other.

6. The combination of claim 5 and further comprising attaching means associated with said pair of panels and with said central divider to maintain the inboard edges of said panel members attached to said roof assembly.

7. A combination of claim 6 in which said attaching means include recesses in said divider member and projecting tangs attached to said panels for engagement in said recesses.

8. The combination of claim 1 and further comprising an auxiliary channel formed adjacent to the forward, rearward and central edges of each of said openings, said auxiliary channel supporting a weatherstrip member for engagement with the underside of said panels.

9. The combination of claim 1 and further comprising a H-shaped reinforcing member complementary to said H-shaped frame, said reinforcing member being disposed at the underside of said H-shaped frame, and fastening means connecting said reinforcing member to said H-shaped frame and to said forward and rearward edge portions of said vehicle roof.

10. The combination of claim 7 and further comprising spacer elements forming said recesses to receive said tang members and to maintain the inboard edges of said panels in slightly spaced relationship to said center strip.

* * * * *